(12) United States Patent
Valle

(10) Patent No.: US 6,648,782 B2
(45) Date of Patent: Nov. 18, 2003

(54) ACTUATING APPARATUS FOR A BICYCLE DERAILLEUR, WITH COUPLING CONNECTED TO THE DRIVEN SHAFT

(75) Inventor: Maurizio Valle, Vicenza (IT)

(73) Assignee: Campagnolo Srl, Vicenza (IT)

( * ) Notice: Subject to any disclaimer, the term of this patent is extended or adjusted under 35 U.S.C. 154(b) by 0 days.

(21) Appl. No.: 09/987,808

(22) Filed: Nov. 16, 2001

(65) Prior Publication Data

US 2002/0061797 A1 May 23, 2002

(30) Foreign Application Priority Data

Nov. 17, 2000 (IT) .................................... TO2000A1077

(51) Int. Cl.[7] ............................................... F16H 61/28
(52) U.S. Cl. .......................................... 474/78; 474/80
(58) Field of Search ................................ 474/80, 81, 82, 474/78, 79, 83

(56) References Cited

U.S. PATENT DOCUMENTS

| 3,863,512 | A | * | 2/1975 | Crawley | 474/80 |
| 4,041,788 | A | * | 8/1977 | Nininger, Jr. | 474/80 |
| 4,922,164 | A | * | 5/1990 | Jacobsen et al. | 310/309 |
| 5,480,356 | A | * | 1/1996 | Campagnolo | 404/72 |
| 5,514,041 | A | * | 5/1996 | Hsu | 474/78 |
| 6,162,140 | A | * | 12/2000 | Fukuda | 474/70 |
| 6,350,212 | B1 | * | 2/2002 | Campagnolo | 474/80 |

* cited by examiner

Primary Examiner—Thomas R. Hannon
Assistant Examiner—Vicky A. Johnson
(74) Attorney, Agent, or Firm—Volpe and Koenig, P.C.

(57) ABSTRACT

Electrically operated actuating apparatus for a bicycle derailleur, having an output shaft (16) rotationally connected to a driven shaft (29) by means of a coupling (34), allowing a limited misalignment between the axis (33, 32) of the output shaft (16) and the driven shaft (30). The coupling is preferably an Oldham coupling.

22 Claims, 2 Drawing Sheets

ACTUATING APPARATUS FOR A BICYCLE DERAILLEUR, WITH COUPLING CONNECTED TO THE DRIVEN SHAFT

BACKGROUND OF THE INVENTION

This invention relates to actuating apparatus for a bicycle derailleur, of the type comprising a geared motor unit with an output shaft and a driven shaft rotationally connected to said output shaft.

Studies and researches in the field of electrically operated actuators for controlling the rear derailleur and/or the front derailleur of a bicycle have multiplied in recent years.

The Applicant previously presented U.S. patent application Ser. No. 09/920,763, describing an actuating apparatus for controlling the front derailleur of the type above, in which the output shaft of the geared motor unit is rotationally connected to a driven shaft, comprising a worm screw meshing a geared sector forming a single part with one of the articulated arms in the articulated parallelogram system which connects, according to the conventional technique, the fork element of the front derailleur to the fixed support body fastened to the frame of the bicycle.

SUMMARY OF THE INVENTION

In order to simplify and expedite the assembly of the previously proposed apparatus, this invention relates to an actuating apparatus of the type described at the beginning of this description, characterised in that said driven shaft is connected to the output shaft of the geared motor unit by means of a coupling, which ensures a limited misalignment between the axis of the geared motor output shaft and the axis of the driven shaft.

Thanks to this characteristic, the device according to this invention can be easily fitted, without needing to ascertain whether the axes of the geared motor output shaft and the driven shaft coincide perfectly.

In a preferred form of embodiment, said coupling is an Oldham coupling, comprising a cylindrical body with two end faces, presenting coupling surfaces with ends facing the output shaft of the geared motor unit and the driven shaft, shaped so to allow a misalignment of the axes of said shafts. Preferably, said cylindrical body of the Oldham coupling presents two housings in the shape of reciprocally orthogonal diametral slots, slidingly receiving two axial appendixes projecting from the facing ends of the two shafts connected by the coupling.

The invention is particularly applied to a geared motor unit of the type described in U.S. patent application Ser. No. 09/953,285. As described in this application, the geared motor unit comprises an electrical motor, which body is connected to a fixed supporting body of the derailleur, and a reducer, comprising an epicyclic gear, to which output shaft an angular position sensor of said shaft is associated. This sensor is a rotary potentiometer sensor sending a signal indicating the angular position of the geared motor output shaft to an electronic control unit aboard a bicycle, which cuts off the operation of the electrical motor following the cyclist's command to shift the derailleur to a certain operative position.

BRIEF DESCRIPTION OF THE DRAWINGS

This invention will be better explained by the following detailed descriptions with reference to the accompanying figures as non-limiting examples, wherein.

DETAILED DESCRIPTION OF THE INVENTION

Figure 1:
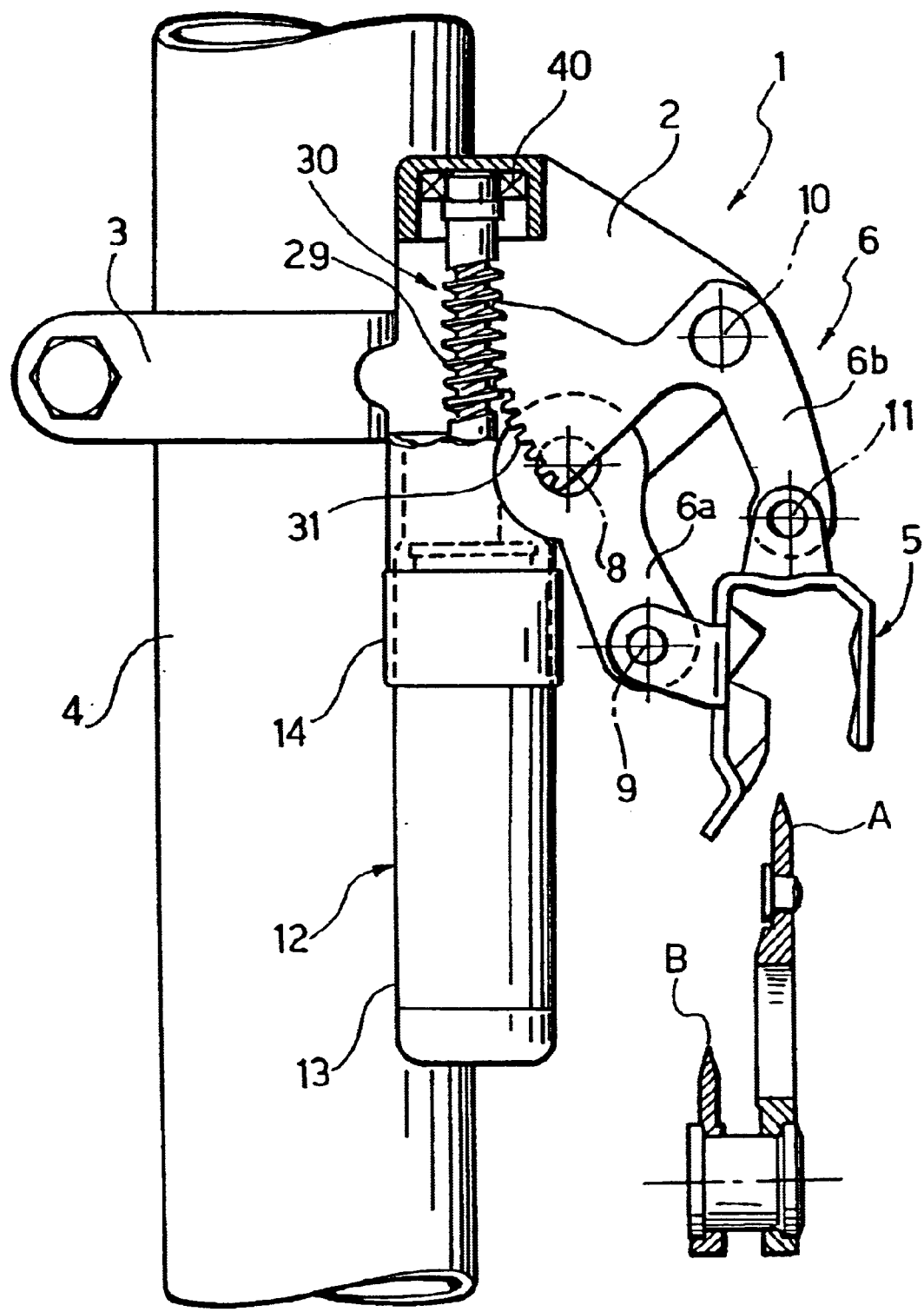
FIG. 1 is an elevated view of an actuating device according to the preferred embodiment of the present invention.

With reference to the drawings, numeral 1 generally indicates a front derailleur of a bicycle, on a transversal plane with respect to the longitudinal direction of the bicycle. The derailleur 1 comprises a fixed supporting body 2 with a clip 3 securing it to a tube 4 of the bicycle frame near the bottom bracket. Letters A, B indicate two conventional internal gears which are associated to the right crank of the bicycle, fitted on the bottom bracket shaft. The derailleur 1 controls the selective engagement of the bicycle chain (not shown in the drawings) on the two internal gears A, B by means of a fork mechanism 5 which is transversally mobile with respect to the fixed supporting body 2, being connected to the body by a parallelogram system 6, comprising a pair of arms 6a, 6b, which are articulated in points 8, 9 and 10, 11, respectively, to the fixed supporting body 2 and to the fork unit 5. The position of the fork unit 5 is determined by an electrically operated actuating apparatus 12.

Figure 2:
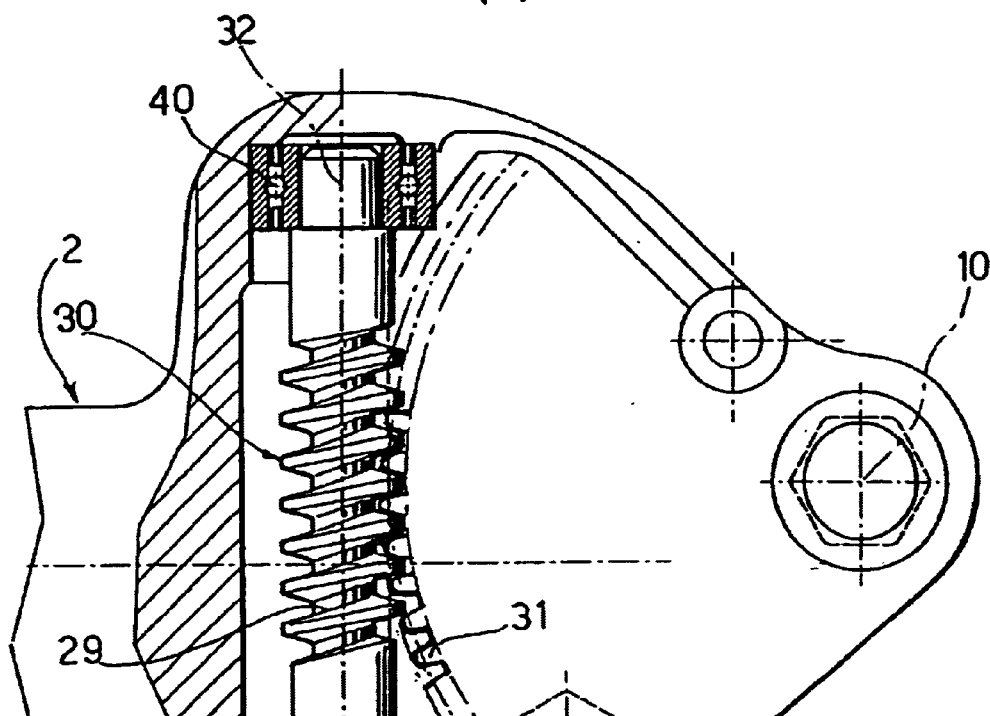
FIGS. 2, 3 are cross-section views illustrating the characteristic forming the object of this invention and a perspective exploded view of a part in FIG. 2.
Figure 3:
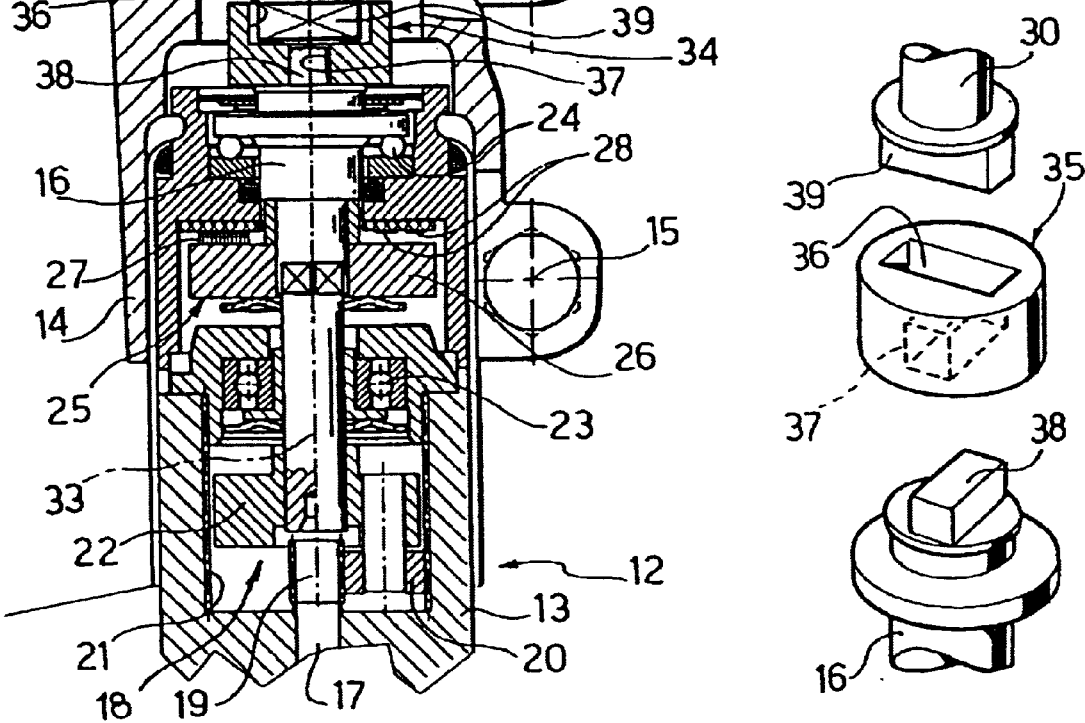

With reference to the FIG. 2, the actuating apparatus 12 comprises an electrical motor with a cylindrical body 13, which is fastened to an end by a clip appendix 14 of the fixed body 2, which can be fastened by means of a screw 15 (see FIG. 2).

As described in the aforementioned U.S. patent application Ser. No. 09/953,285, the body of the electrical actuator 12 rotationally supports an output shaft 16, which is connected to the shaft 17 of the electrical motor by means of a reducer 18 consisting of an epicyclic gear. Particularly, a sun gear 19, meshing one or more satellite gears 20, which in turn mesh the inner gear 21, forming a single part in the body 13 of the motor, is fitted on the shaft of the electrical motor 17. The satellite gears 20 are rotationally fitted on a gear holder set 22, which is fitted on the output shaft 16. This is rotationally fitted in the body of an actuator by means of a pair of ball bearings 23, 24, which in the example shown are a radial bearing and a thrust bearing. Again as described in the aforesaid patent application, the output shaft 16 of the geared motor is associated with an angular shaft position sensor 25, including a rotating plate 26 carrying a brush 27, which co-operates with the electrically conducting plates 28, connected to the body of the actuating device. Finally, the output shaft 16 of the geared motor unit is rotationally connected to a driven shaft 30, which, as described in U.S. patent application Ser. No. 09/920,763, incorporates a worm screw 29, meshing a sprocket 31, which is an integral appendix of the articulated arm 6b of the parallelogram system 6.

In the previously proposed solutions, the driven shaft 30 is rigidly connected to the output shaft 16 of the geared motor. Consequently, in order to ensure the correct operation of the device, a certain precision is required so that the axis 32 of the driven shaft 30 perfectly coincides with the axis 33 of the geared motor output shaft 16.

According to this invention, the shaft 30 is connected to the shaft 16 by means of a misalignment coupling 34, allowing a limited misalignment of the axes 32, 33, which, consequently, can be kept reciprocally parallel, however at a certain distance, instead of being rigidly connected.

In the example shown, the coupling 34 is a Oldham coupling, comprising a cylindrical body 35 with two respectively orthogonal diametral slots 36, 37 on the two opposite faces, in which two axial tab appendixes 38, 39, projecting from the facing ends of the shafts 16, 30, are slidingly fitting. Naturally, an Oldham coupling in which the cylindrical body 35 presents male coupling elements co-operating with female coupling elements on the two ends of the shaft 30, 16, can be employed. However, the arrangement shown as an example in FIG. 2 ensures advantages from the point of view of size in the axial direction.

Evidently, any other type of known coupling allowing a limit misalignment of the two axes 33, 32 can be used instead of the Oldham coupling.

Thanks to the arrangement described above, the front derailleur is pre-assembled with the actuating apparatus 12 before being fitted on the frame of a bicycle with simple and rapid operations. The position of the axis 32 of the shaft 30 is determined by two ball bearings 40, 41, which are carried by the fixed supporting body 2, which rotationally support the driven shaft 30. The position of the geared motor output shaft 16 is determined by engaging the body 13 of the geared motor in a tubular clip appendix 14 of the fixed supporting body 2. When the geared motor unit is fitted in the clip appendix 14, the axis 33 may be misaligned with respect to the axis 32.

However, the assembly of the apparatus and its subsequent correct operation are ensured by the coupling 34.

Naturally, numerous changes can be implemented to the construction and forms of embodiment of the invention herein envisaged, all comprised within the context of the concept characterising this invention, as defined by the following claims.

What is claimed is:

1. Actuating device for a bicycle derailleur comprising:
   a geared motor unit including an electrical motor connected to an output shaft;
   a driven shaft rotationally connected to output shaft on an extension of the output shaft; and
   a misalignment coupling, connected between the output shaft and the driven shaft, which ensures a limited misalignment between an axis of the geared motor output shaft and an axis of the driven shaft.

2. Actuating device according to claim 1, wherein said coupling is an Oldham coupling.

3. Actuating device according to claim 2, wherein the Oldham coupling has a cylindrical body including opposing end faces presenting two reciprocally orthogonal diametrical slots, which slideably engage axial tab appendixes on ends of the output shaft and the driven shaft.

4. Actuating device according to claim 1, wherein a sensor of an angular position of the output shaft is associated to said output shaft.

5. Actuating device according to claim 4, wherein said sensor is a rotary potentiometer.

6. Actuating device according to claim 1, wherein the derailleur is a front derailleur of a bicycle, in that said driven shaft comprises a worm screw and that said front derailleur comprises an articulated arm rigidly connected to a geared sector meshing the worm screw.

7. The device of claim 1 wherein the electric motor is connected to the output shaft by a reducer.

8. The device of claim 7 wherein said coupling is an Oldham coupling.

9. The device of claim 7 wherein a sensor of an angular position of the output shaft is associated to said output shaft.

10. The device of claim 9 wherein said sensor is a rotary potentiometer.

11. An actuating device for use on a bicycle derailleur having a fixed supporting body, a geared sector pivotably attached to the supporting body, and an articulated arm operatively associated with the geared sector, the device comprising:
    a geared motor unit including an electrical motor and an output shaft;
    a misalignment coupling connected to the output shaft of the geared motor; and
    a driven shaft, having first and second ends, connected to the misalignment coupling at the first end and operatively associated with the geared sector;
    whereby the misalignment coupling allows for a limited axial misalignment between the driven shaft and the output shaft.

12. The actuating device of claim 11 wherein the misalignment coupling is Oldham coupling.

13. The actuating device of claim 11 wherein the driven shaft includes a worm screw which engages the geared sector.

14. The actuating device of claim 13 wherein the driven shaft is rotatably connected to the supporting body at the second end of the driven shaft.

15. The actuating device of claim 11 wherein the geared motor unit further includes an angular position sensor to detect a rotational position of the output shaft.

16. A combination actuating device and bicycle derailleur for use on a bicycle having a frame and a bicycle transmission chain, operatively associated with the derailleur, carried by the frame, the combination comprising:
    a supporting body for attachment to the bicycle frame;
    a fork unit for derailing the transmission chain;
    an articulated arm pivotably attached to the supporting body and the fork unit and a geared sector extending therefrom;
    a geared motor unit mounted to the supporting body including an electrical motor and an output shaft;
    a misalignment coupling connected to the output shaft of the geared motor; and
    a driven shaft, having first and second ends, connected to the misalignment coupling at the first end and operatively associated with the geared sector, whereby the misalignment coupling allows for a limited axial misalignment between the driven shaft and the output shaft.

17. The combination device of claim 16 wherein the misalignment coupling comprises a cylindrical body having first and second opposing parallel faces, a first slot on the first face, a second slot perpendicular to the first slot on the second face, a first axial tab appendix rigidly connected to the output shaft and slideably received by the first slot, and a second axial tab appendix rigidly connected to the driven shaft and slideably received by the second slot.

18. The combination device of claim 16 wherein the driven shaft includes a worm screw which engages the geared sector.

19. The combination device of claim 18 wherein driven shaft is connected to the supporting body at the second end of the driven shaft.

20. The combination device of claim 16 wherein the geared motor unit further includes an angular position sensor to detect a rotational position of the output shaft.

21. The combination device of claim 16 wherein the angular position sensor is a rotary potentiometer.

22. The combination device of claim 16 wherein the geared motor further includes a reducer connecting the electrical motor and the output shaft.

* * * * *

UNITED STATES PATENT AND TRADEMARK OFFICE
CERTIFICATE OF CORRECTION

PATENT NO. : 6,648,782 B2
DATED : November 18, 2003
INVENTOR(S) : Maurizio Valle Page 1 of 1

It is certified that error appears in the above-identified patent and that said Letters Patent is hereby corrected as shown below:

<u>Column 3,</u>
Line 38, after the word "to," and before the word "output," insert the word -- the --.

Signed and Sealed this

Thirteenth Day of April, 2004

JON W. DUDAS
*Acting Director of the United States Patent and Trademark Office*